（12） United States Patent
Lee

(10) Patent No.: US 6,497,487 B2
(45) Date of Patent: Dec. 24, 2002

(54) MICRO DISPLAY PROJECTION SYSTEM HAVING ELECTRONICALLY CONTROLLED COLOR SWITCHES

(75) Inventor: Sang-Hae Lee, Suwon (KR)

(73) Assignee: SamSung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/874,980

(22) Filed: Jun. 7, 2001

(65) Prior Publication Data

US 2002/0080333 A1 Jun. 27, 2002

(30) Foreign Application Priority Data

Nov. 2, 2000 (KR) ........................................ 2000-64938

(51) Int. Cl.⁷ ............................................... G03B 21/00
(52) U.S. Cl. ....................................................... 353/31
(58) Field of Search ............................. 353/30, 31, 34, 353/39, 84, 122, 33; 349/56, 5, 6, 7, 8, 9, 78, 81, 82, 83

(56) References Cited

U.S. PATENT DOCUMENTS 5,398,081 A * 3/1995 Jones .......................... 348/742
6,334,685 B1 * 1/2002 Slobodin ...................... 353/31

\* cited by examiner

Primary Examiner—Russell Adams
Assistant Examiner—Andrew Sever
(74) Attorney, Agent, or Firm—Robert E. Bushnell, Esq.

(57) ABSTRACT

A micro display projection system having electronically controlled color switches comprises: an image producing part for producing images to be projected under electronic control; an illumination part for illuminating light; a color division part having semitransparent reflection mirrors for transmitting red(R), green(G) and blue(B) colors, respectively, derived from the illuminated light; a color switching part having plural color switches disposed on the respective light paths from the respective reflection mirrors, each color switch having a light stopper region and a light transmission region to project the respective R, G and B colors separated in the color division part; and a light collecting part disposed adjacent to the color switching part for converging the colors so as to illuminate the respective colors on regions of the image producing part.

24 Claims, 4 Drawing Sheets

MICRO DISPLAY PROJECTION SYSTEM HAVING ELECTRONICALLY CONTROLLED COLOR SWITCHES

CLAIM OF PRIORITY

This application makes reference to, incorporates the same herein, and claims all benefits accruing under 35 U.S.C. §119 from my application AN OPTICAL IMAGE PROJECTION SYSTEM USING SIMPLE ELECTRONIC COLOR SWITCHES filed with the Korean Industrial Property Office on Nov. 2, 2000 and there duly assigned Serial No. 64938/2000.

BACKGROUND OF THE INVENTION

1. Technical Field

The present invention relates to a micro display projection system having an electronically controlled color switch and, more particularly, to a micro display projection system having electronically controlled color switches which are capable of realizing color images by dividing a color switch plane into three equal parts, each of which projects video images having only one of red(R), green(G) and blue(B) colors.

2. Related Art

Basically, a micro display projection system for realizing a color screen includes a color separating part which separates and projects, on a screen part, light carrying video image signals corresponding to respective images of R, G and B colors produced by an image producing part. The color separating part typically includes a color wheel, a color switch, a scrolling color switch, and the like.

However, there is a problem in the operation of the color wheel and the color switch in that a "color break phenomenon" is experienced. In addition, the color wheel and color switch have one third of the brightness of a micro display projection basically constituted with three panels.

Use of a scrolling color switch avoids one of the latter problems in that the color break phenomenon caused by use of the color wheel or the color switch does not occur. However the manufacturing cost of the color switch is high since the R, G and B colors have to be transmitted by one color switch. Moreover, the brightness of the color switch decreases to one third that of the existing three-panel micro display projection system.

Therefore, there is a need for development of a micro display projection system which avoids all of the latter problems, that is, the color break phenomenon, the reduction in brightness, and high production cost.

SUMMARY OF THE INVENTION

In order to overcome the above problems, it is an object of the present invention to provide a micro display projection system having electronically controlled color switches.

In order to achieve the above object, a micro display projection system having color switches comprises: an image producing part electronically controlled by an image producing unit for producing an electrical signal having an image signal, and for producing an image to be projected; an illumination part constructed so as to illuminate light on the image producing part; a color division part, including semi-transparent reflection mirrors disposed between the illumination part and the image producing part, for transmitting only the light corresponding to each of the R, G and B colors from the illuminated light; a color switching part constructed with plural color switches disposed on respective light paths having R, G and B colors separated by the respective reflection mirrors of the color division part; and a light collecting part disposed adjacent to the color switching part, and illuminating respective light on trisected regions of the image producing part. Each color switch transmits light through only one region of the trisected regions, each transmitting the light separated by the color division part in different regions relative to each other, and each being electronically controlled to sequentially change the light transmission regions formed in the respective color switches on the surfaces of the color switches. The light collecting part is trisected in the same manner as the color switching part, and projects light having a video image signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, and wherein:

FIG. 1b is a view showing a color wheel for separating a light source into red(R), green(G) and blue(B) colors in the micro display projection system of FIG. 1a;

FIG. 1c is a view showing a color switch for separating a light source into colors in the micro display projection system of FIG. 1a;

FIG. 1d is a view showing a scrolling color switch for separating a light source into R, G and B colors in the micro display projection system of FIG. 1a;

DETAILED DESCRIPTION OF THE PREFERRED EMBODIMENT

Hereinafter, an embodiment of the present invention will be described in detail with reference to the accompanying drawings.

Figure 1A:
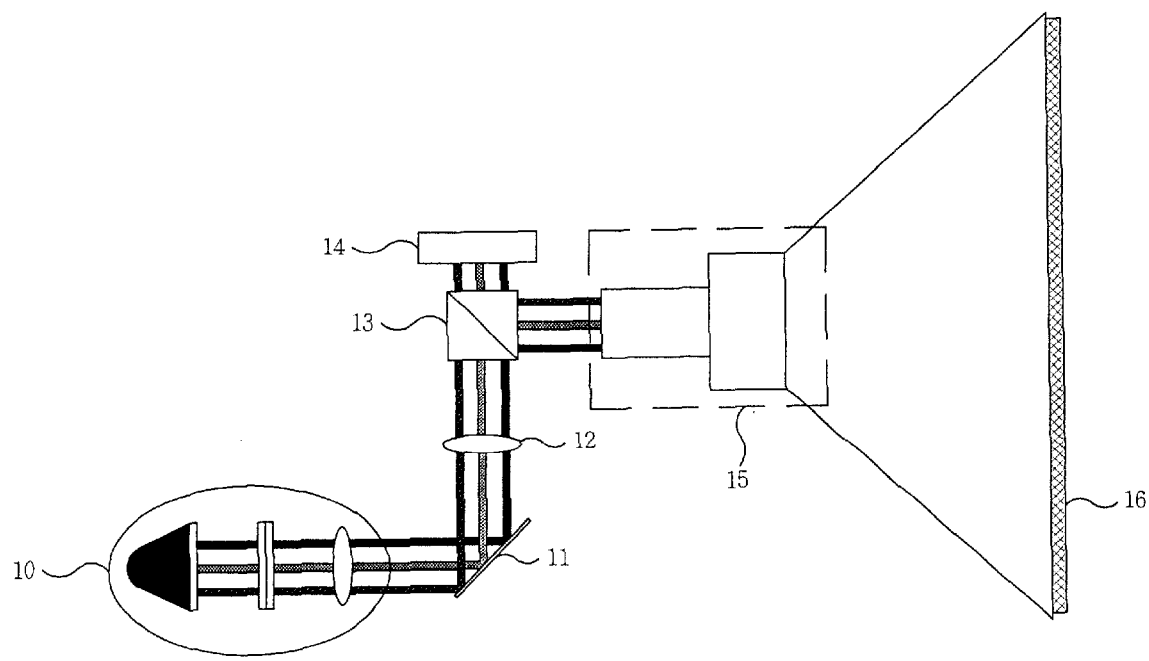
FIG. 1a is a view showing the structure of a micro display projection system including an optical system for projecting a color screen.
Figure 1B:
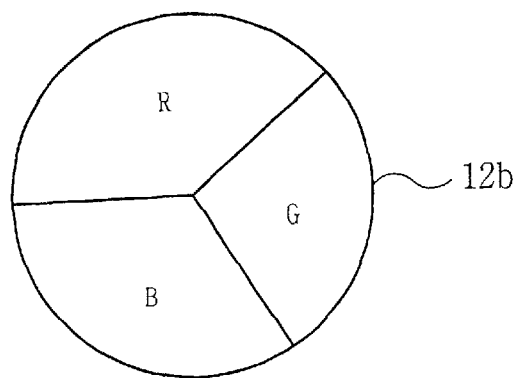
Figure 1C:
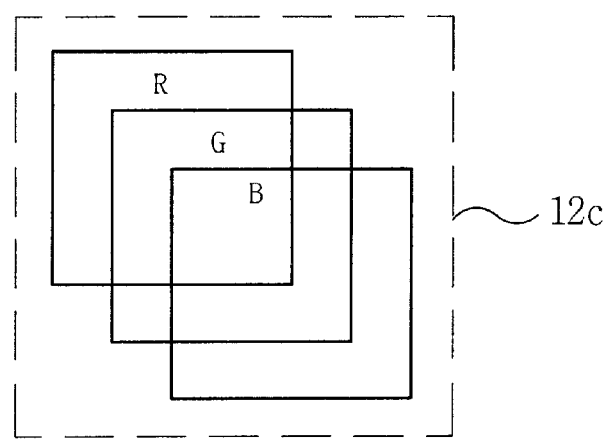
Figure 1D:
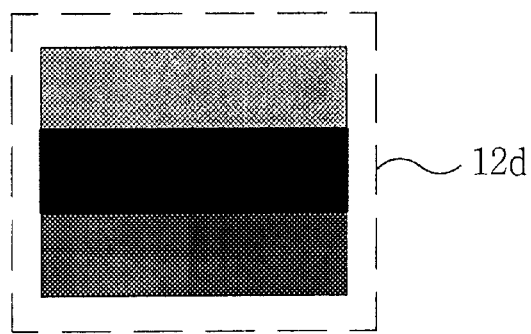

FIG. 1a is a view showing the structure of a micro display projection system including an optical system for projecting a color screen; FIG. 1b is a view showing a color wheel for separating a light source into red(R), green(G) and blue(B) colors in the micro display projection system of FIG. 1a; FIG. 1c is a view showing a color switch for separating a light source into R, G and B colors in the micro display projection system of FIG. 1a; and FIG. 1d is a view showing a scrolling color switch for separating a light source into R, G and B colors in the micro display projection system of FIG. 1a.

As shown in FIG. 1a, a micro display projection system for realizing a color screen includes an illumination part 10, a reflection mirror 11, a color separating part 12, a prism 13, an image producing part 14, a projection part 15, and a screen part 16. The color separating part 12 separates, for projection on the screen part 16, light carrying video image signals corresponding to respective images of the R, G and B colors to be produced by the image producing part 14, and a color video image is displayed. The constituents for the color separating part 12 include a color wheel 12b, a color switch 12c, a scrolling color switch 12d, and so on.

The color wheel 12b is a disc having fan-shaped sectors uniformly disposed along the circumference of the disk. The sectors transmit the R, G and B colors, respectively. The color wheel 12b constructed as above is rotated by a motor (not shown) and is controlled to transmit corresponding light in synchronization with video images corresponding to the respective R, G and B colors produced by the image producing part 14, thereby transmitting the respective images of the R, G and B colors by frame unit. The color wheel 12b has an overall frequency of 180 Hz since the R, G and B colors have respective frequencies of 60 Hz. There exists a problem with the latter arrangement in that a "color break phenomenon" takes place since color wheel 12b displays the R, G and B colors alternatively by frame unit, and the color wheel 12b has one-third of the brightness of a micro display projection basically constituted with three panels.

The color switch 12c shown in FIG. 1c, unlike the color wheel 12b, is constructed to transmit all three (R, G and B) colors from one panel. The color switch 12c having the above structure is rotatably driven by a motor (not shown) electronically controlled so as to be switched in correspondence with the respective images corresponding to the R, G and B colors to be produced in the image producing part 14, so that a color image is displayed on the screen part 16. The color switch 12c has the advantage of] increased precision in accordance with a synchronous signal as compared to the color wheel 12b. However, there exists a problem in that displaying the three (R, G and B) colors alternatively by means of one panel causes the same color break phenomenon as in the color wheel 12b, and the color switch 12c also has one-third of the brightness of the three-panel micro display projection system.

A scrolling color switch 12d, as shown in FIG. 1d, operates in accordance with a method different from the method of alternatively displaying light of the R, G and B colors carried out by the color wheel 12b and the color switch 12c. The scrolling color switch 12d displays the three R, G and B colors on one screen continuously. The scrolling color switch 12d is constructed with a panel equally divided into three regions, each of which transmits light of a respective one of the R, G and B colors. The equally divided regions of the scrolling color switch 12d are electronically controlled to sequentially change their positions. Accordingly, even though the scrolling color switch 12d has the advantage of avoiding or eliminating the color break phenomenon experienced by the color wheel 12b and the color switch 12c, there exists another problem in that the manufacturing cost is high because all of the R, G and B colors have to be transmitted by one color switch. In addition, the brightness decreases to one-third that of the existing three panel micro display projection system because of illumination of the three (R, G and B) colors while rotating the three equally divided regions of the color switch 12d.

Figure 2:
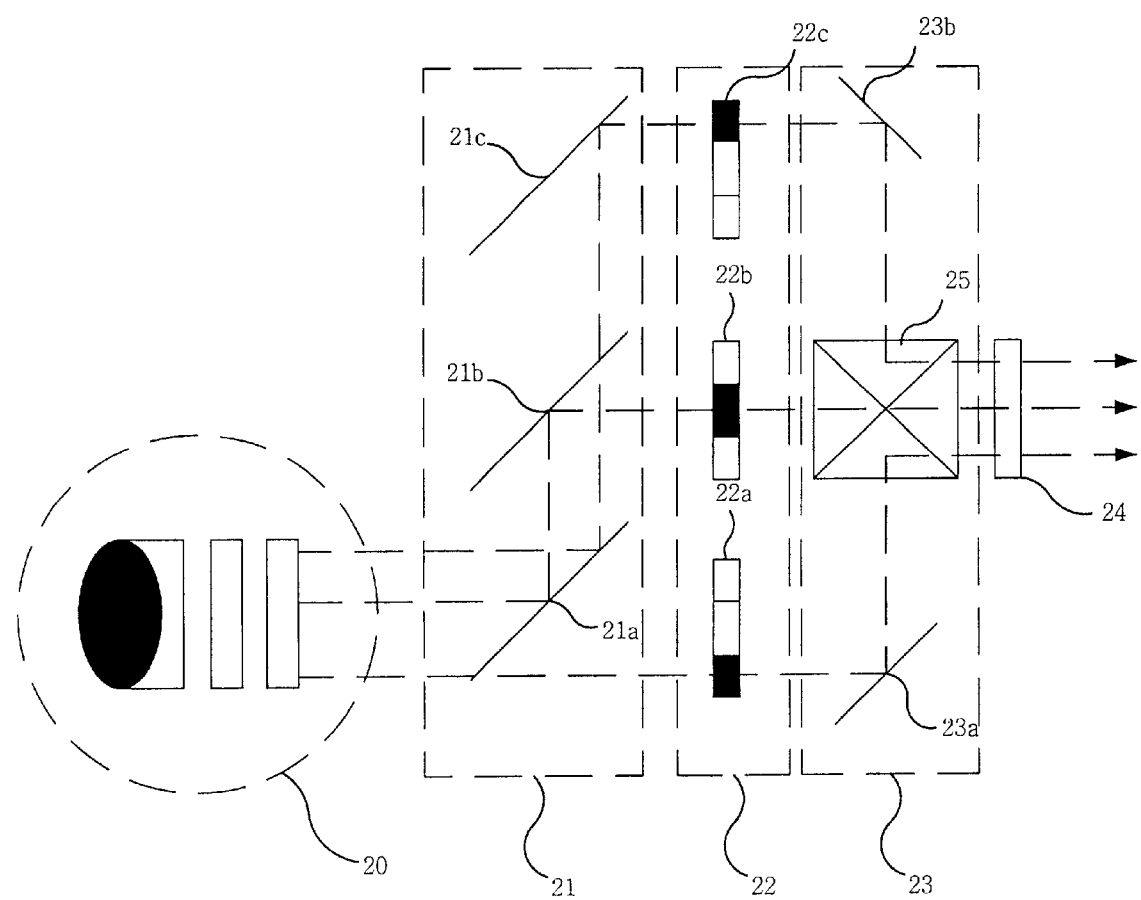
FIG. 2 is a view showing the structure of a micro display projection system having a transmission-type image producing part according to an embodiment of the present invention.

FIG. 2 is a view showing the structure of a micro display projection system having a transmission-type image producing part according to a preferred embodiment of the present invention.

As shown in FIG. 2, the micro display projection system has a transmission-type image producing part 24 which is electronically controlled by an image producing unit (not shown) for generating an electrical signal having an image signal, and for producing an image to be projected. The system also includes: an illumination part 20 constructed to illuminate light for provision to the image producing part 24; a color division part 21 disposed between the illumination part 20 and the image producing part 24, and comprising semitransparent reflection mirrors 21a, 21b, and 21c for transmitting only light corresponding to the respective R, G and B colors from the illuminated light, and for reflecting other light; a color switching part 22 comprising plural color switches 22a, 22b, and 22c, respectively, disposed on the respective paths of light corresponding to the respective R, G and B colors reflected by the reflection mirrors 21a, 21b, and 21c of the color division part 21, each color switch 22a, 22b and 22c being divided into a light stopper region and a light transmission region in order to transmit light corresponding to each of three equally divided regions of the image producing part 24, the regions of color switches 22a, 22b and 22c being changed in a certain order through electronic control of the light transmission region and the stopper region, and each being electronically controlled to transmit light separated into the R, G and B colors, respectively, in the color division part 21; and a light collecting part 23 comprising reflection mirrors 23a and 23b and a prism 25 disposed adjacent to the color switching part 22 for focusing light on the respective regions of the image producing part 24 corresponding to the three regions of the color switching part 22 so as to illuminate light of the respective R, G and B colors, and for projecting the reflected light on a screen.

The color division part 21 comprises first, second and third semitransparent reflection mirrors 21a, 21b, and 21c, respectively, and a more detailed description of the semitransparent reflection mirrors 21a, 21b and 21c follows.

Each of the semitransparent reflection mirrors 21a, 21b and 21c is constructed to transmit only specific light. That is, if light corresponding to the R color is transmitted through the first semitransparent reflection mirror 21a, the rest of the light is reflected so as to be incident on the second semitransparent reflection mirror 21b. If the second semitransparent reflection mirror 21b transmits the light corresponding to the B color, the rest of the light corresponding to the G color is reflected, and the light corresponding to the transmitted B color becomes incident on the third semitransparent reflection mirror 21c. The third semitransparent reflection mirror 21c is constructed so as to transmit only light of the G color, and the light of the B color is incident on the third semitransparent reflection mirror 21c and is reflected. As a result, the R, G and B colors are separated by the color division part 21.

The color switching part 22 has first, second, and third color switches 22a, 22b, and 22c, respectively, and a more detailed description of the first, second, and third color switches 22a, 22b, 22c, respectively, follows.

Each of the first, second, and third color switches 22a, 22b, and 22c, respectively, comprises a panel divided into three regions. Each of the three divided regions is electronically controlled to perform the alternative functions of transmitting or blocking light. The region of blocking light is a light stopper region, and occupies two-thirds of the entire panel region, and the region of transmitting light is a light transmission region, and occupies one-third of the entire panel region. The identity of each region constructed as above can be changed, during operation, to a light transmission region or a light stopper region by electronic control which is realized by constructing the color switches 22a, 22b and 22c with liquid crystal panels to block or transmit light through electronic control with respect to each of the three divided regions. Each color switch 22a, 22b and 22c, constructed as above, transmits any light reaching the corresponding color switch through the light transmission region of that switch. That is, the R, G and B colors are separated through the color division part 21, and the first, second, and third color switches 22a, 22band 22c, respectively, of the color switching part 22 perform only the role of blocking or transmitting the light reaching the switch regardless of the color of the light. In this way, the cost of controlling and manufacturing a color filter can be reduced, and the realization of the light transmission system can be more effectively attained. The light transmission regions of the first, second, and third color switches 22a, 22b, and 22c, respectively, are controlled to realize the light transmission regions in different positions relative to each other. Further, the three color switches 22a, 22b and 22c simultaneously change the positions of the regions in the same order, so that the lights of the R, G and B colors are electronically controlled so as to be illuminated on the image producing part 24 in a certain order relative to each other.

The operation of the micro display projection system according to an embodiment of the present invention, as shown in FIG. 2, will be described as follows.

The light transmitted by the first semitransparent reflection mirror 21a from the light outputted from the illumination part 20 becomes incident on the first color switch 22a, and then is separated by one-third and proceeds through the light transmission region formed in the first color switch 22a. The light reflected by the first semitransparent reflection mirror 21a is incident on the second semitransparent reflection mirror 22b, the second semitransparent reflection mirror 22b reflects the incident light except for the light transmitted through the second semitransparent reflection mirror 21b, and such reflected light illuminates another one-third region in the second color switch 22b different from the above one-third region of the first color switch 22a. Next, the light transmitted by the second semitransparent reflection mirror 22b becomes incident on, and is entirely reflected by, the third semitransparent reflection mirror 21c, and that reflected light is incident on the third color switch 22c. Only the light corresponding to a one-third region in third color switch 22c, different from the above regions in color switches 22a and 22b, is transmitted, and it illuminates the remaining one-third region of the image producing part 24. The lights of the three R, G and B colors transmitted by the respective transmission regions formed in the first, second, and third color switches 22a, 22b, and 22c, respectively, have image information which is transmitted by illuminating the regions corresponding to the respective regions of the image producing part 24, and the lights of the respective R, G and B colors having the image information are projected onto a screen to produce a color video image.

With respect to the electronic control of the color switches 22a, 22b and 22c, as mentioned above, the control is effected so that the light transmission regions are in different unique positions in each color switch. Thus, referring to FIG. 2, the light transmission region (indicated by the black shaded square) for color switch 22a is at the top (hereinafter "position A"), the light transmission region for color switch 22b is in the middle (hereinafter "position B"), and the light transmission region for color switch 22c is at the bottom (hereinafter "position C").

As also mentioned above, through electronic control, the positioning of the light transmission region in each color switch is changed. For example, the sequence is as follows:

| Sequence | Switch A | Switch B | Switch C |
|---|---|---|---|
| 1 | A | B | C |
| 2 | B | C | A |
| 3% | C | A | B |

Figure 3:
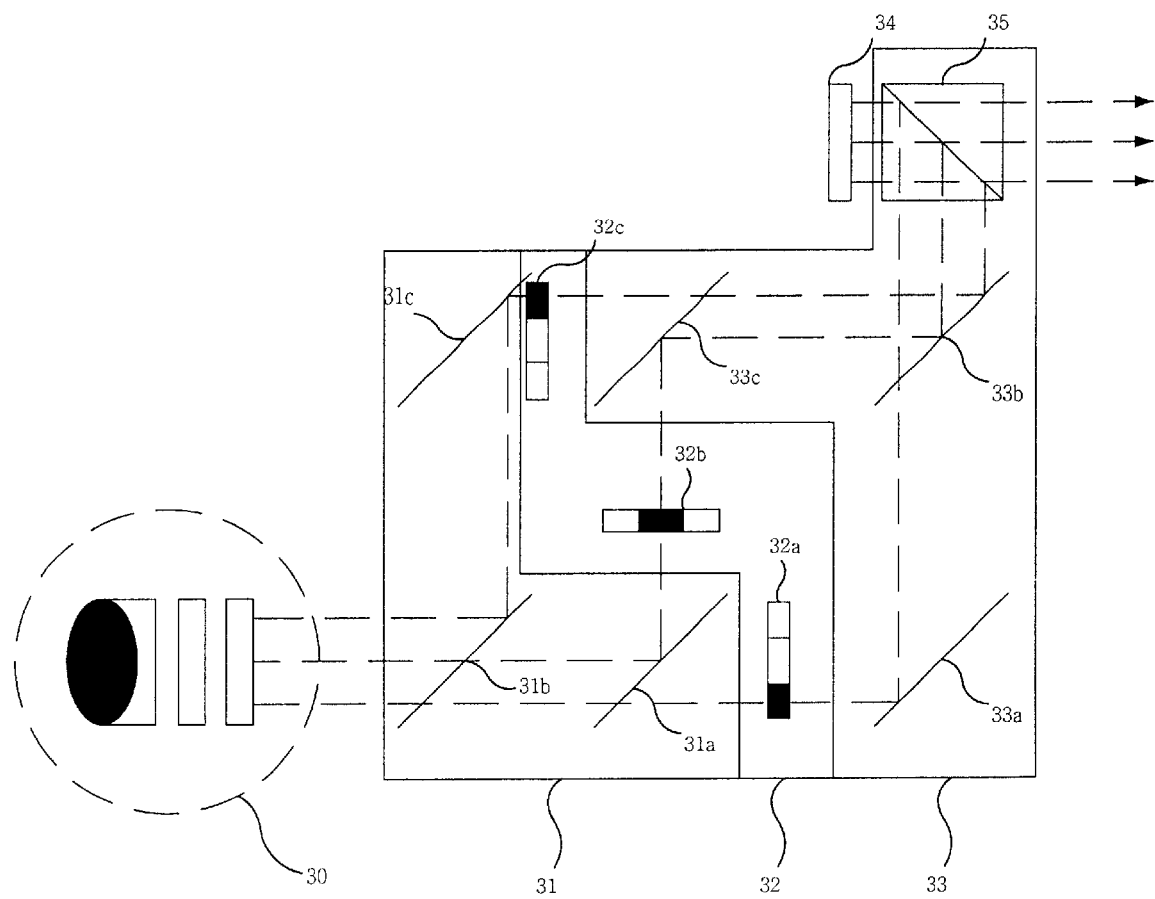
FIG. 3 is a view showing the structure of a micro display projection system having a reflection-type image producing part according to another embodiment of the present invention.

FIG. 3 is a view showing a micro display projection system having a reflection-type image producing part 34 according to another preferred embodiment of the present invention.

As shown in FIG. 3, the micro display projection system has a reflection-type image producing part 34 and also includes an illumination part 30 and a color division part 31 equipped with semitransparent reflection mirrors 31a, 31b, and 31c in order to transmit only light of particular colors different from each other and derived from the three R, G and B colors. The system also includes: a color switching part 32 comprising color switches 32a, 32b, and 32c, respectively, electronically controlled to illuminate only the respective regions of equal trisections of the image producing part 34, and to transmit only the light reaching divided regions which are different from each other; a light collecting part 33 comprising plural semitransparent reflection mirrors 33a, 33b, and 33c, respectively, and a prism 35 to converge light transmitted in different respective paths from the color switching part 32 in order that the light be illuminated on each of the trisected regions of the image producing part 34; and a reflection-type image producing part 34 for reflecting the light at the same time as loading in the corresponding reflected light and projecting image information. The operations of FIG. 3 are the same as shown in FIG. 2. The difference between FIG. 2 and FIG. 3 is that the transmission-type image producing part 24 displays video images by transmitting light, while the reflection-type image producing part 34 displays color images projected on a screen with the light of the three R, G and B colors being reflected from the image producing part 34.

The image producing parts 24 and 34 of FIG. 2 and FIG. 3, respectively, may be constructed using liquid crystal display panels. A transmission-type liquid crystal display panel is employed in FIG. 2, and a reflection-type liquid crystal display panel is employed in FIG. 3, according to the embodiments of the present invention.

Although preferred embodiments of the present invention have been described, it will be understood by those skilled in the art that the present invention should not be limited to the described preferred embodiment, but various changes and modifications can be made within the spirit and scope of the present invention as defined by the appended claims.

What is claimed is:

1. A micro display projection system, comprising:
an image producing part for producing images to be projected;
an illumination part constructed to illuminate light;
a color division part, including semitransparent reflection mirrors, disposed adjacent to the illumination part for deriving red(R), green(G) and blue(B) colors from the illuminated light, and for simultaneously transmitting the derived R, G and B color along separate respective light paths;
a color switching part including plural color switches, each of said color switches being positioned on one of the respective light paths, each of said color switches being trisected to have light stopper regions and a light transmission region for transmitting light for illumination in correspondence to a respective trisected region of the image producing part, and each of said color switches being electronically controlled so that light of each respective color from the color division part is sequentially transmitted in different successive regions of the color switching part by sequentially changing positions of the light transmission region of each of said color switches in a certain order; and a light collecting part disposed between the color switching part and the image producing part for converging the light from the color switching part onto the image producing part to illuminate light of different ones of the respective R, G and B colors on different respective ones of the trisected regions of the image producing part.

2. The micro display projection system as claimed in claim 1, wherein one of said semitransparent reflection mirrors transmits a respective one of the R, G and B colors and reflects others of the R, G and B colors.

3. The micro display projection system as claimed in claim 2, wherein another of said semitransparent reflection mirrors transmits another respective one of the R, G and B colors and reflects a further respective one of the R, G and B colors.

4. The micro display projection system as claimed in claim 3, wherein a further one of said semitransparent reflection mirrors reflects the further respective one of the R, G and B colors.

5. The micro display projection system as claimed in claim 1, wherein the image producing part comprises one of a reflection-type liquid crystal display panel and a transmission-type liquid crystal display panel.

6. The micro display projection system as claimed in claim 1, wherein the light stopper regions comprise regions corresponding to two-thirds of a panel of each said color switch, the light transmission region comprises a region corresponding to one-third of the panel of each said color switch, and the light transmission region is electronically controlled to sequentially change from a present one-third region to a next one-third region in each said color switch.

7. The micro display projection system as claimed in claim 1, wherein said color switching part comprises a plurality of liquid crystal display panels, one for each said color switch.

8. The micro display projection system as claimed in claim 1, wherein one of said semitransparent reflection mirrors transmits two of the R, G and B colors and reflects a third one of the R, G and B colors.

9. The micro display projection system as claimed in claim 8, wherein another of said semitransparent reflection mirrors transmits one of the two of the R, G and B colors and reflects another of the two of the R, G and B colors.

10. The micro display projection system as claimed in claim 9, wherein a further one of said semitransparent reflection mirrors reflects the third one of the R, G and B colors.

11. A micro display projection system, comprising:
image producing means for producing images to be projected;
illumination means for illuminating light;
color division means adjacent to said illumination means for deriving red (R), green (G) and blue (B) colors from the illuminated light, and for transmitting the derived R, G and B colors along separate respective light paths;
color switching means including plural color switches, each of said color switches being positioned on one of said respective light paths, each of said color switches being trisected to have light stopper regions and a light transmission region for transmitting said respective one of said colors for illumination in correspondence to a respective trisected region of said image producing means; and light collecting means disposed between said color switching means and said image producing means for converging the colors from said color switching means onto said image producing means to illuminate different ones of the respective R, G and B colors on respective ones of the trisected regions of said image producing means.

12. The micro display projection system as claimed in claim 11, wherein said color division means comprises semitransparent reflection mirrors for transmitting respective ones of the R, G and B colors.

13. The micro display projection system as claimed in claim 12, wherein one of said semitransparent reflection mirrors transmits a respective one of the R, G and B colors and reflects others of the R, G and B colors.

14. The micro display projection system as claimed in claim 13, wherein another of said semitransparent reflection mirrors transmits another respective one of the R, G and B colors and reflects a further respective one of the R, G and B colors.

15. The micro display projection system as claimed in claim 14, wherein a further one of said semitransparent reflection mirrors reflects the further respective one of the R, G and B colors.

16. The micro display projection system as claimed in claim 12, wherein one of said semitransparent reflection mirrors transmits two of the R, G and B colors and reflects a third one of the R, G and B colors.

17. The micro display projection system as claimed in claim 16, wherein another of said semitransparent reflection mirrors transmits one of the two of the R, G and B colors and reflects another of the two of the R, G and B colors.

18. The micro display projection system as claimed in claim 17, wherein a further one of said semitransparent reflection mirrors reflects the third one of the R, G and B colors.

19. The micro display projection system as claimed in claim 11, wherein said image producing means comprises one of a reflection-type liquid crystal display panel and a transmission-type liquid crystal display panel.

20. The micro display projection system as claimed in claim 11, wherein the light stopper regions comprise regions corresponding to two-thirds of a panel of each said color switch and the light transmission region comprises a region corresponding to one-third of the panel of each said color switch.

21. The micro display projection system of claim 20, wherein said light transmission is electronically controlled to sequentially change from a current region to a next region in each said color switch.

22. The micro display projection system as claimed in claim 11, wherein each said color switch comprises a liquid crystal display panel.

23. The micro display projection system as claimed in claim 11, wherein each said color switch is electronically controlled so that positions of the light transmission region and the light stopper regions in each said color switch are changed in accordance with a certain sequence.

24. The micro display projection system as claimed in claim 23, wherein the light stopper regions comprise regions corresponding to two-thirds of a panel of each said color switch and the light transmission region comprises a region corresponding to one-third of the panel of each said color switch.

* * * * *